United States Patent
Cimatti (10) Patent No.: US 9,303,720 B2
(45) Date of Patent: Apr. 5, 2016

(54) "V" INTERNAL COMBUSTION ENGINE PROVIDED WITH BALANCING COUNTERSHAFT (71) Applicant: Ferrari S.p.A., Modena (IT)

(72) Inventor: Franco Cimatti, Pavullo (IT)

(73) Assignee: Ferrari S.p.A., Modena (IT)

( * ) Notice: Subject to any disclaimer, the term of this patent is extended or adjusted under 35 U.S.C. 154(b) by 0 days.

(21) Appl. No.: 14/268,124

(22) Filed: May 2, 2014

(65) Prior Publication Data

US 2014/0326200 A1 Nov. 6, 2014

(30) Foreign Application Priority Data

May 3, 2013 (IT) .............. BO2013A0196

(51) Int. Cl.
| | |
|---|---|
| *F16F 15/26* | (2006.01) |
| *F01B 1/04* | (2006.01) |
| *F02B 67/04* | (2006.01) |
| *F02B 75/22* | (2006.01) |
| *F01L 1/047* | (2006.01) |
| *F01P 5/12* | (2006.01) |

(52) U.S. Cl.
CPC ............... *F16F 15/264* (2013.01); *F01B 1/04* (2013.01); *F01L 1/047* (2013.01); *F01P 5/12* (2013.01); *F02B 67/04* (2013.01); *F02B 75/22* (2013.01); *F16F 15/262* (2013.01)

(58) Field of Classification Search
CPC ............. F02B 67/06; F02B 75/22; F01P 5/12
USPC .......... 123/41.46, 41.47, 90.31, 90.34, 192.1, 123/192.2
See application file for complete search history.

(56) References Cited

U.S. PATENT DOCUMENTS

| | | | | |
|---|---|---|---|---|
| 4,553,473 | A | * 11/1985 | Ichida et al. | 92/261 |
| 5,010,859 | A | * 4/1991 | Ogami et al. | 123/195 C |
| 5,216,989 | A | 6/1993 | Iwata et al. | |
| 5,564,380 | A | 10/1996 | Kobayashi et al. | |
| 5,735,239 | A | * 4/1998 | Sugano et al. | 123/90.31 |
| 5,970,931 | A | * 10/1999 | Kawarabata | 123/90.31 |
| 6,732,694 | B2 | * 5/2004 | Holweg | 123/179.25 |
| 7,090,552 | B2 | * 8/2006 | Katayama | 440/88 A |
| 7,434,555 | B2 | * 10/2008 | Okamoto | 123/90.31 |
| 8,408,188 | B1 | * 4/2013 | Hormilla | 123/559.1 |
| 2003/0019459 | A1 | 1/2003 | Ohsawa | |
| 2003/0062211 | A1 | * 4/2003 | Tsuruda | 180/291 |
| 2008/0251051 | A1 | * 10/2008 | Maruyama | 123/508 |
| 2012/0111298 | A1 | * 5/2012 | Matsuo et al. | 123/192.2 |

FOREIGN PATENT DOCUMENTS

| | | |
|---|---|---|
| WO | WO 01/36839 A1 | 5/2001 |
| WO | WO 2010/053055 A1 | 5/2010 |

\* cited by examiner

*Primary Examiner* — Lindsay Low
*Assistant Examiner* — Long T Tran
(74) *Attorney, Agent, or Firm* — Blank Rome LLP (57) ABSTRACT

An internal combustion engine having: a crankshaft; camshafts that activate intake and exhaust valves; an auxiliary shaft, which rotates in an opposite direction with respect to the crankshaft and is unbalanced so as to act as balancing countershaft; and a mechanical transmission, which receives the movement from the crankshaft and controls the timing by causing the rotation of the camshafts and, at the same time, causes the rotation of the auxiliary shaft.

6 Claims, 7 Drawing Sheets

"V" INTERNAL COMBUSTION ENGINE PROVIDED WITH BALANCING COUNTERSHAFT

BACKGROUND OF THE INVENTION

1. Field of the Invention

The present invention relates to a "V" internal combustion engine provided with balancing countershaft.

2. Description of the Related Art

The balancing shaft is a component of an internal combustion engine which is useful for reducing the vibrations caused by engine unbalance which generates reciprocating second order forces and inertia forces. By limiting vibrations, the balancing countershaft can extend the life of the internal combustion engine, and improves both the performance of the internal combustion engine and the driver's comfort.

The main vibrations in an internal combustion engine are not due to the combustion of the mixture in the cylinders, even if the crankcase is particularly rigid, nor are they caused by the rotation of the crankshaft, which is balanced by means of particular counterweights or particular shapes (unless it is designed together with the countershaft to balance the forces which generate the vibrations), but are instead determined by the reciprocating movement of the pistons which accelerate under the bias of the gas, slowing down abruptly and resuming speed by reversing their direction of motion.

Each change of these changes of speed corresponds to a thrust on the crankshaft which tends to shake the crankcase: for example, during the step of combustion, the piston is "shot" as a projectile and is called back by the connecting rod-crank system, which supports the consequent "whiplash" and transmits it, in form of thrusts (named inertia forces) to the engine assembly, this being why the engine is coupled to the vehicle body by means of elastic mounts which damp, but do not cancel out, the vibration disturbance. The piston causes the most violent shaking when the direction of motion is reversed: in each instant of its movement, however, the system balance is disturbed because it is never stationary or at constant speed: indeed, there is always a step of acceleration or deceleration which generates a trust on the crankcase, in turn.

By starting, for example, from top dead center (TDC), i.e. from the point in which the piston stops its upwards stroke and assuming that the engine turns at constant speed, the speed of the piston is high at approximately mid stroke (when it is half way between the two dead centers, slightly displaced towards the top dead center, this depends on the length of the connecting rod with respect to the crank), followed by a slow phase as it approaches the dead center, but the piston acceleration values are maximum at the dead centers and zero at mid stroke (where the speed is maximum); the greater the inertia force (which also depends on the reciprocating moving mass, i.e. the piston first and foremost) and the vibration, the more accentuated the accelerations. This disparity of speed and accelerations, and the consequent inequality of the inertia forces make it necessary to equip even naturally well balanced engines with special balancing shafts (named "countershafts").

However, the addition of balancing countershafts in an internal combustion engine inevitably causes an increase of cost, weight and dimensions (not only due to the presence of the balancing countershafts but also for the presence of the mechanical transmission which draws the movement of the crankshaft must activate the balancing countershafts).

U.S. Pat. No. 5,564,380 describes an internal combustion engine having: a crankshaft; camshafts that activate intake and exhaust valves; an auxiliary shaft, which rotates in an opposite direction with respect to the crankshaft and is unbalanced so as to act as balancing countershaft; and a mechanical transmission, which receives the movement from the crankshaft and controls the timing by causing the rotation of the camshafts and, at the same time, causes the rotation of the auxiliary shaft. However, in the solution suggested in U.S. Pat. No. 5,564,380 the tappets of one head are more stressed (and thus subject to higher mechanical wear) than the tappets of the other head.

SUMMARY OF THE INVENTION

It is the object of the present invention to provide a "V" internal combustion engine provided with balancing countershaft which is free from the drawbacks described above and which is easy and cost-effective to make at the same time.

According to the present invention a "V" internal combustion engine provided with balancing countershaft is provided as disclosed in the accompanying claims.

BRIEF DESCRIPTION OF THE DRAWINGS

The present invention will now be described with reference to the accompanying drawings, which illustrate some non-limitative embodiments thereof, in which.

PREFERRED EMBODIMENTS OF THE INVENTION

Figure 1:
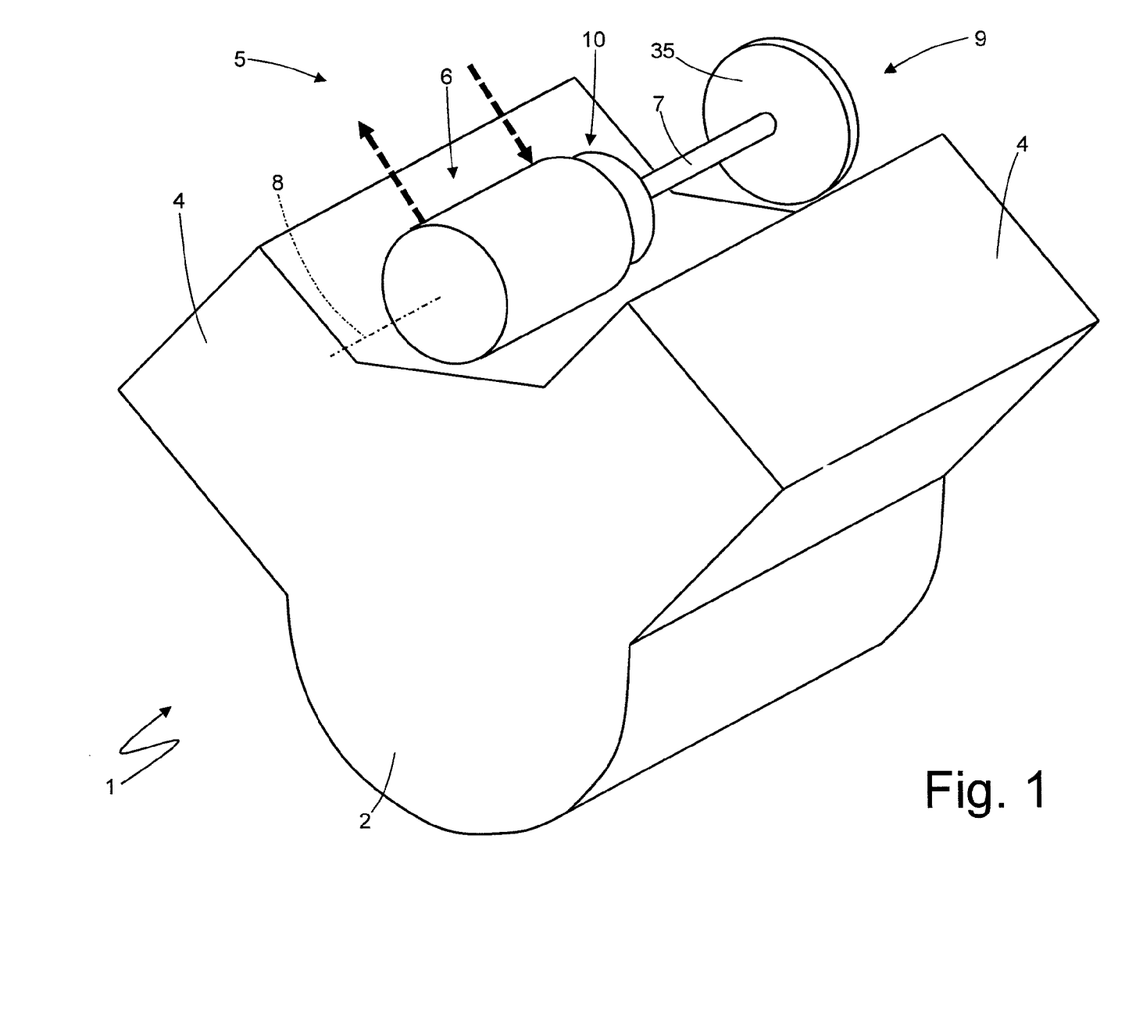
FIG. 1 is a diagrammatic, perspective view of an internal combustion engine made according to the present invention.

In FIG. 1, reference numeral 1 indicates an internal combustion engine as a whole.

The internal combustion engine 1 comprises a crankcase 2 which houses a crankshaft 3 (diagrammatically shown in FIGS. 6 and 7) and two heads 4, which house the cylinders and are arranged in a "V" with a 90° angle between the heads.

The internal combustion engine 1 comprises a cooling system 5 (diagrammatically shown) for cooling the internal combustion engine 1, which comprises a hydraulic circuit in which a coolant (typically consisting of water mixed with an antifreeze additive) flows. The cooling system 5 comprises a circulation pump 6 of the centrifuge type for circulating the coolant along the hydraulic circuit.

The internal combustion engine 1 comprises an auxiliary shaft 7, which is mounted so as to rotate about a rotation axis 8 and transmits the rotational movement to the circulation pump 6. According to a preferred embodiment, the auxiliary shaft 7 is parallel to the crankshaft 3 and receives movement directly from the crankshaft 3 by means of a mechanical belt (or according to a technical equivalent, a chain) transmission; i.e. the mechanical belt transmission 9 transmits the rotational movement from the crankshaft 3 to the auxiliary shaft 7. The internal combustion engine also comprises a coupling device 10 which is interposed between the circulation pump 6 and the auxiliary shaft 7 and is suited to mechanically connect/disconnect the circulation pump 6 to/from the auxiliary shaft 7.

According to a preferred embodiment, shown in FIG. 1, the auxiliary shaft 7 (together with the circulation pump 6 and the coupling device 10) is arranged above the crankcase 2 of the thermal engine 1 and between the two heads 4, i.e. between the space delimited by the side of the two heads 4 arranged in a "V".

Figure 2:
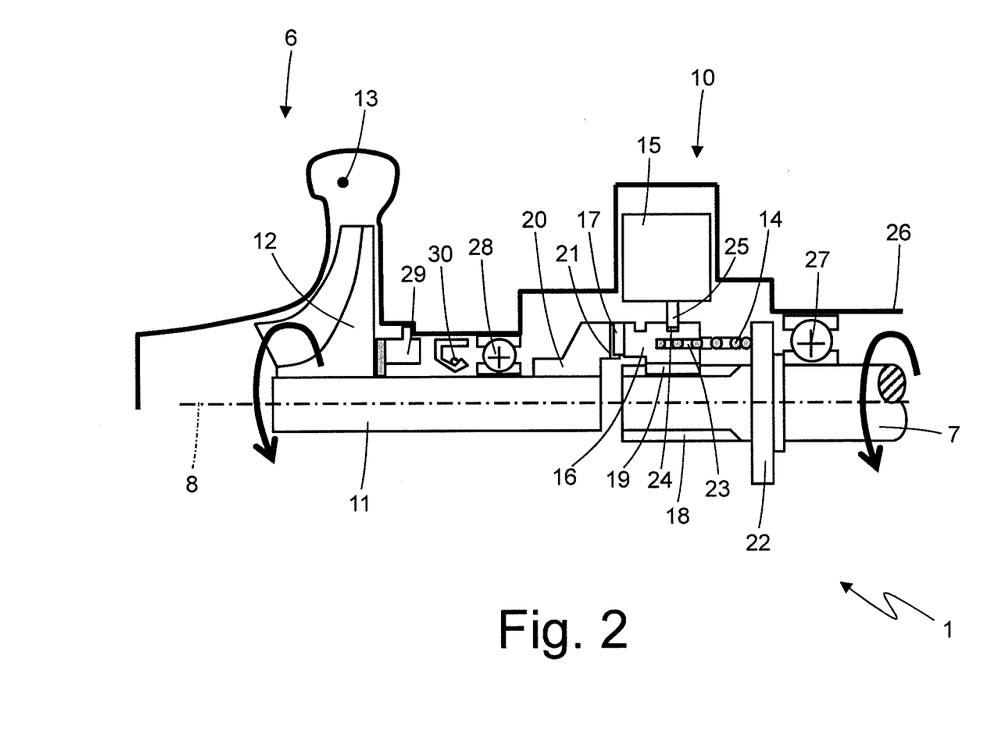
FIG. 2 is a diagrammatic, partial, axial section view of an auxiliary shaft of the internal combustion engine in FIG. 1 coupled to a circulation pump of a cooling system by means of the interposition of a coupling device.

As shown in FIG. 2, the circulation pump 6 comprises a pump shaft 11 which is mounted so as to rotate coaxially with the auxiliary shaft 7 (and is thus mounted so as to rotate about the rotation axis 9); the pump shaft 11 supports an impeller 12 which rotates within a pumping chamber 13.

The coupling device 10 comprises a spring 14, which tends to push the coupling device 10 towards a coupling position (shown in FIG. 2), in which the pump shaft 11 of the circulation pump 6 is integral with the auxiliary shaft 7. Furthermore, the coupling device 10 comprises an actuator 15, which is suited to be activated so as to move the coupling device 10, against the action of the spring 14, from the coupling position (shown in FIG. 2) to a decoupling position (shown in FIG. 3), in which the pump shaft 11 of the circulation pump 6 is disconnected from the auxiliary shaft 7. By virtue of the presence of the spring 14, the coupling device 10 is normally coupled, i.e. in the absence of control the coupling device 10 is in the coupling position (shown in FIG. 2); such a feature privileges the integrity of the internal combustion engine 1, because the operation of the circulation pump 6 is always guaranteed in case of problems to the actuator 15, and thus the cooling of the internal combustion engine 1 is guaranteed.

The actuator 15 may be of the active type, i.e. may comprise an electrically controlled actuator which may be remotely operated by an electronic control unit or may be of the passive type, i.e. may comprise a coolant temperature sensitive element (e.g. a thermostat element of the bimetallic type).

Figure 3:
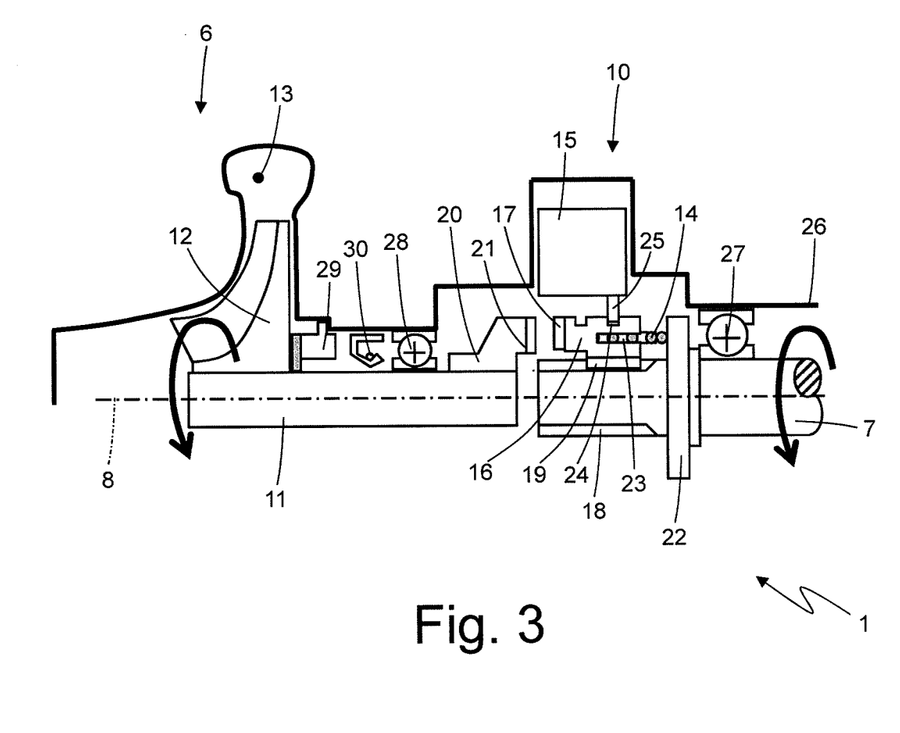
FIG. 3 is a diagrammatic, partial and axial section view of the auxiliary shaft in FIG. 2 in which the coupling device is arranged in a decoupling position different from the coupling position shown in FIG. 2.

The coupling device 10 comprises a sleeve 16 which is provided with a frontal toothing 17 is mounted so as to axially slide about the auxiliary shaft 7, and is provided with axial teeth 18 which engage corresponding axial teeth 19 of the auxiliary shaft 7 to be angularly integral with the auxiliary shaft 7 and at the same time to be able to slide axially with respect to the auxiliary shaft 7 itself. Furthermore, the coupling device 10 comprises a sleeve 20 which is provided with a frontal toothing 21, is integral with the pump shaft 11 of the circulation pump 6, and is arranged in front of the sleeve 16 so that the sliding of the sleeve 16 makes the frontal toothing 17 of the sleeve 16 engage/disengage the frontal toothing 21 of the sleeve 20.

According to a preferred embodiment, the spring 14 is compressed between the sleeve 16 and an annular abutment 22 integral with the auxiliary shaft 7. Furthermore, the sleeve 16 has an axially oriented annular groove 23 in which an end of the spring 14 is inserted. The sleeve 16 has a circumferentially oriented annular groove 24 which is engaged by a finger 25 of the actuator 15 which transmits the movement generated by the actuator 15 itself to the sleeve 16.

According to a preferred embodiment, a single common containing casing (box) 26 within which the circulation pump 6 and the coupling device 10 are housed is provided. There is (at least) one bearing 27 interposed between the containing casing 26 and the auxiliary shaft 7, while there is (at least) one bearing 28 interposed between the containing casing 26 and the pump shaft 11 of the circulation pump 6. According to a preferred embodiment, the coupling device 10 is in an oil bath (i.e. is submerged in oil) to allow the continual lubrication of the sleeves 16 and 20 and the bearings 27 and 28. A gland 29 is interposed between the coupling device 10 and the circulation pump 6 and near the circulation pump 6 to contain the water within the pumping chamber 13, i.e. to prevent the leakage of water outside the circulation pump 6; furthermore, a sealing ring 30 is arranged between the coupling device 10 and the circulation pump 6 and near the coupling device 10 to contain the oil within the coupling device 10, i.e. to prevent the leakage of oil outside the coupling device 10. According to a preferred embodiment, the containing casing 26 comprises a leakage discharge channel (not shown) which originates from a "dry" annular zone comprised between the gland 29 on one side and the sealing ring 30 on the other side.

In the embodiment shown in FIGS. 1, 2 and 3, the pump shaft 11 of the circulation pump 6 is arranged by the side of the auxiliary shaft 7; in other words, the auxiliary shaft 7 ends at the assembly formed by the circulation pump 6 and the coupling device 10.

Figure 4:
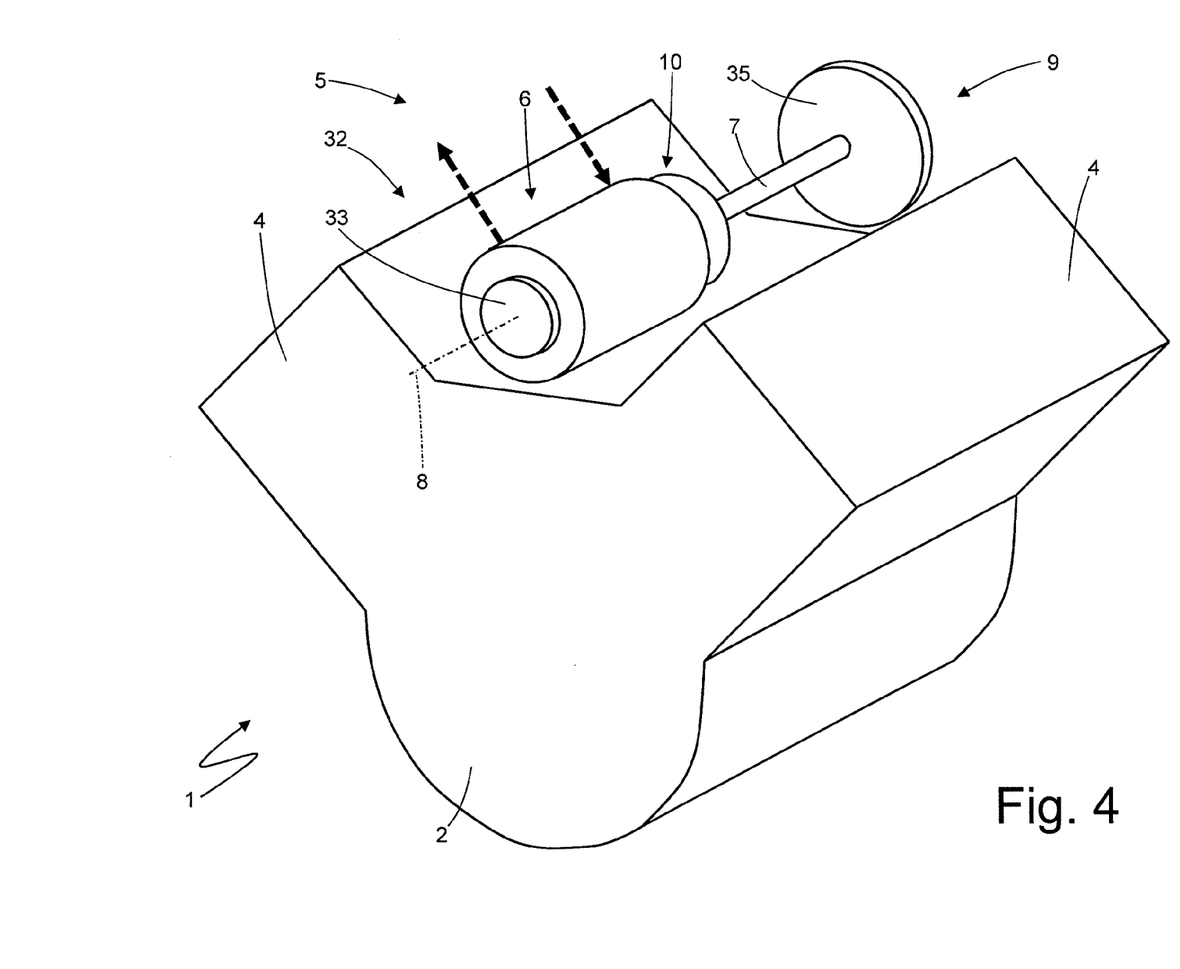
FIG. 4 is a diagrammatic, perspective view of a variant of the internal combustion engine in FIG. 1.
Figure 5:
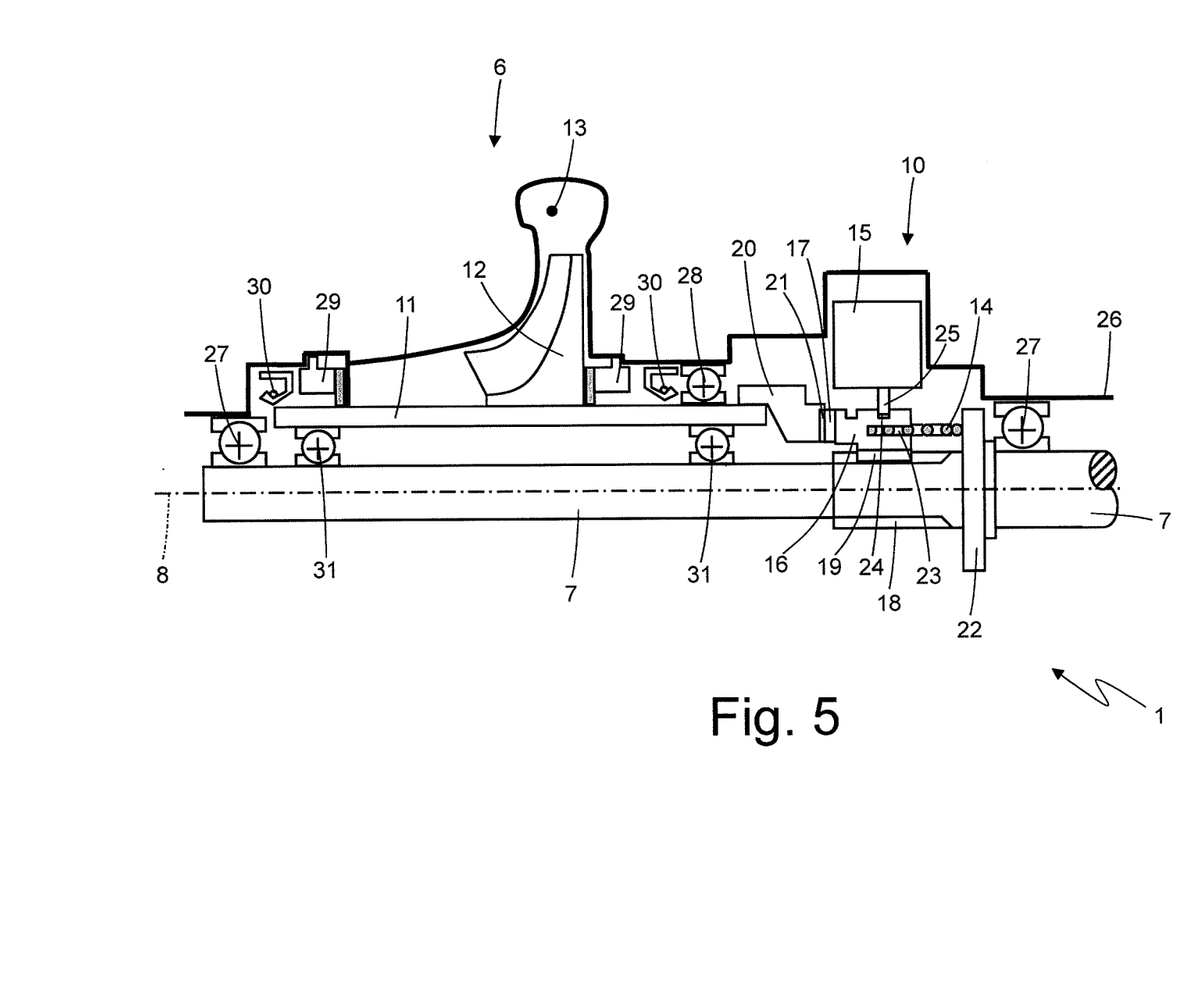
FIG. 5 is a diagrammatic, partial, axial section view of an auxiliary shaft of the internal combustion engine in FIG. 4 coupled to a circulation pump of a cooling system by means of the interposition of a coupling device.

In the embodiment shown in FIGS. 4 and 5, the pump shaft 11 of the circulation pump 6 is hollow inside and arranged about the auxiliary shaft 7, which passes through the pump shaft 11 itself; in other words, the auxiliary shaft 7 passes through the assembly formed by the circulation pump 6 and the coupling device 10 within the pump shaft 11 of the circulation pump 6. As shown in FIG. 5, in this embodiment a pair of bearings 31 are interposed between the pump shaft 11 of the circulation pump 6 and the auxiliary shaft 7 to allow a relative rotation between the pump shaft 11 of the circulation pump 6 and the auxiliary shaft 7.

As shown in FIG. 4, on the side opposite to the mechanical transmission 9, the auxiliary shaft 7 is mechanically connected to a further belt (or according to a technical equivalent, chain) mechanical transmission 32 intended to activate at least one auxiliary device (e.g. a pump of a power steering device or a compressor of a climate control system). In other words, the auxiliary shaft 7 protrudes from one side of the internal combustion engine 1 to connect to the mechanical transmission 9 and the auxiliary shaft 7 protrudes from the side opposite to the internal combustion engine 1 to connect to the mechanical transmission 32. In this manner, the two mechanical transmissions 9 and 32 are arranged at the opposite sides of the internal combustion engine 1 and are mechanically connected to opposite ends of the auxiliary shaft 7.

As shown in FIG. 4, the mechanical transmission 32 comprises a wheel 33 (a pulley in the case of a belt transmission or a toothed wheel in the case of the chain transmission) which is rigidly fixed to an end of the auxiliary shaft 7 and is engaged by a belt or by a chain (not shown) which activates the auxiliary device (not shown).

Figure 6:
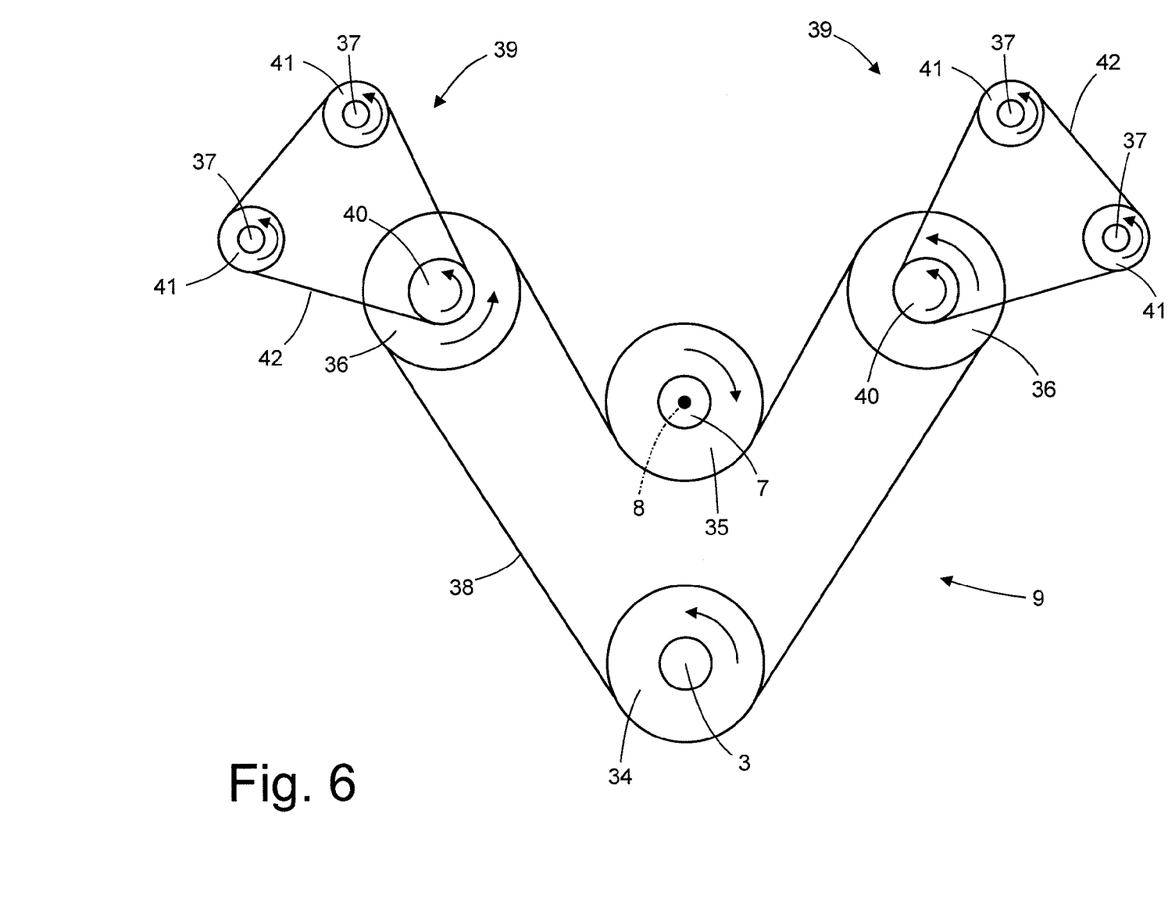
FIG. 6 is a diagrammatic, front view of a mechanical transmission of the internal combustion engine in FIG. 1 which activates the auxiliary shaft in FIG. 2 and which is not made according to the invention.

As shown in FIG. 6 (which is not the object of the present invention), the mechanical transmission 9 comprises a wheel 34 (a pulley in the case of a belt transmission or a toothed wheel in the case of a chain transmission) which is rigidly fixed to the crankshaft 3, a wheel 35 (a pulley in the case of a belt transmission or a toothed wheel in the case of a chain transmission) which is rigidly fixed to an end of the auxiliary shaft 7, and two further wheels 36 (pulleys in the case of a belt transmission or toothed wheels in the case of a chain transmission) for controlling the timing of the internal combustion engine 1, i.e. for rotating the camshafts 37 which activate the intake and exhaust valves of the internal combustion engine 1. In other words, the mechanical transmission 9 constitutes the first demultiplication of the rotation of the crankshaft 3 towards the camshafts 37. Furthermore, the mechanical transmission 9 comprises a flexible transmission element 38 (a belt in the case of a belt transmission or a chain in the case of a chain transmission) which is closed in a ring shape and wound about the wheels 34, 35 and 36 and makes the wheels 34, 35 and 36 integral with each other.

Figure 7:
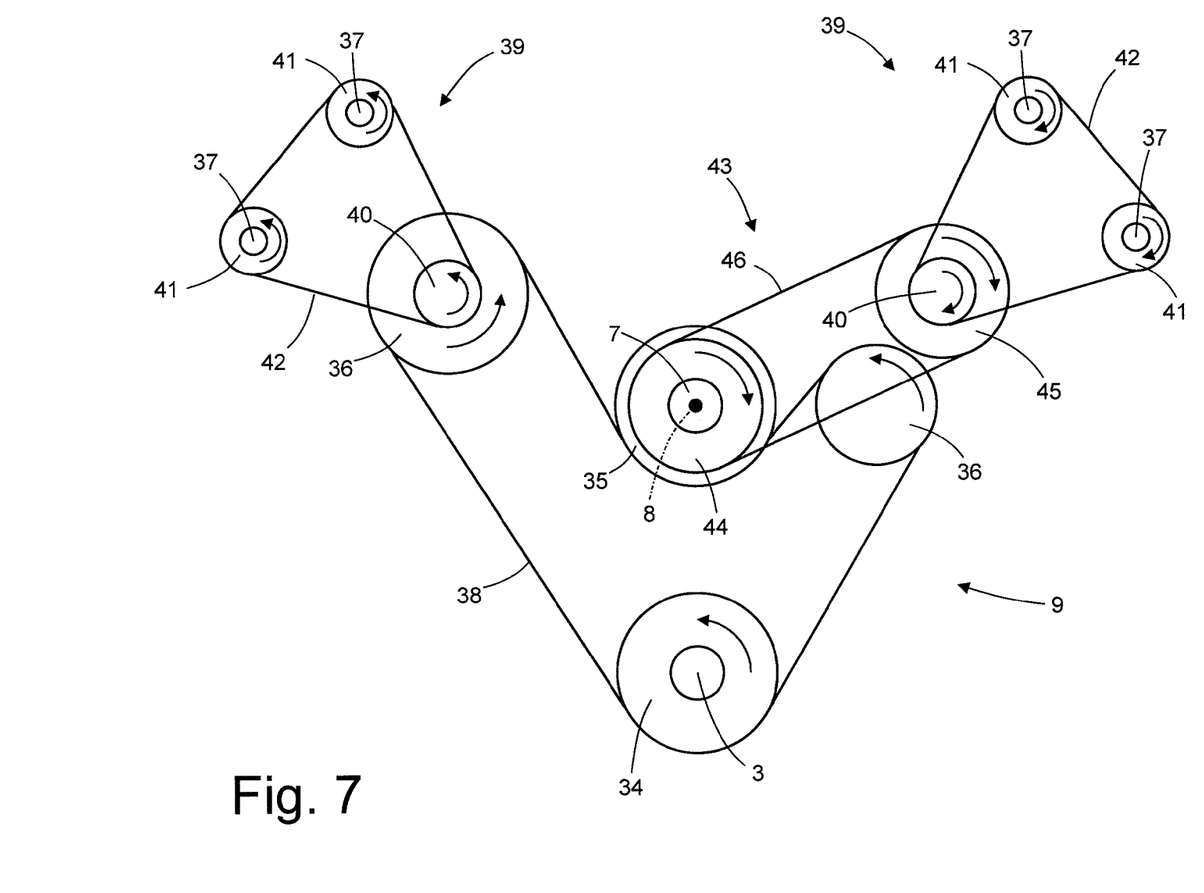
FIG. 7 is a diagrammatic, front view of a mechanical transmission of the internal combustion engine in FIG. 1 which activates the auxiliary shaft in FIG. 2 and which is made according to the invention.

Each head 4 of the internal combustion engine 1 comprises a corresponding mechanical transmission 39 which receives movement from the crankshaft 3 by means of the mechanical transmission 9 and activates the two camshafts 37. Each mechanical transmission 39 comprises a wheel 40 (a pulley in the case of a belt transmission or a toothed wheel in the case of a chain transmission) which is integral with a corresponding wheel 36 and two wheels 41 (pulleys in the case of a belt transmission or toothed wheels in the case of a chain transmission), each of which is integral with a corresponding camshaft 37. Furthermore, each mechanical transmission 39 comprises a flexible transmission element 42 (a belt in the case of a belt transmission or a chain in the case of a chain transmission) which is closed in a ring shape and wound about the wheels 40 and 41 and makes the wheels 40 and 41 integral with each other.

In the embodiment shown in FIG. 6, the mechanical transmission 9 directly activates both mechanical transmissions 39 of the two heads 4 and consequently, all the camshafts 37 rotate in the same direction; such a solution has some drawbacks because the tappets of one head 4 are inevitably more stressed and thus subjected to greater mechanical wear than the tappets of the other head 4. In order to avoid stressing the tappets of one head 4 more, the embodiment shown in FIG. 7 (which constitutes the object of the present invention) may be used in which the mechanical transmission 9 directly activates a single mechanical transmission 39, while it indirectly activates the other mechanical transmission (i.e. by means of the interposition of a further mechanical transmission 43); by virtue of the presence of the further mechanical transmission 43, the direction of rotation of the mechanical transmission 39, which is coupled to the further mechanical transmission 43, is reversed and thus the camshafts 37 of one head 4 rotate in the opposite direction to the camshafts 37 of the other head 4. In this manner, the two heads 4 are perfectly symmetric and thus the tappets of the two heads 4 are mechanically stressed exactly in the same manner.

The further mechanical transmission 43 comprises a wheel 44 (a pulley in the case of a belt transmission or a toothed wheel in the case of a chain transmission) which is integral with the wheel 35 of the mechanical transmission 9 and a wheel 45 (a pulley in the case of a belt transmission or a toothed wheel in the case of a chain transmission) which is integral with the wheel 40 of the corresponding mechanical transmission 39. Furthermore, the further mechanical transmission 43 comprises a flexible transmission element 46 (a belt in the case of a belt transmission or a chain in the case of a chain transmission) which is closed in a ring shape and wound about the wheels 44 and 45 and makes the wheels 44 and 45 integral with each other. In this embodiment, the wheel 36 of the mechanical transmission 9 arranged near the further mechanical transmission 43 is mechanically disconnected from the other elements (obviously except for the flexible transmission element 38 of the mechanical transmission 9) and performs the sole function of flexible transmission element 38 of the mechanical transmission 9.

It is worth noting that the auxiliary shaft 7 is arranged in central position and rotates in direction opposite to the crankshaft 3 (i.e. is counter-rotating), thus the auxiliary shaft 7 may be unbalanced (i.e. provided with eccentric masses) to balance the internal combustion engine 1 (i.e. to compensate the vibrations generated by the operation of the internal combustion engine 1 at least in part). Obviously, by appropriately dimensioning the wheels 34 and 35 of the mechanical transmission 9 it is possible to obtain the desired ratio between the angular speed crankshaft 3 and the angular speed of the auxiliary shaft 7 in order to optimize the balancing operated by the auxiliary shaft 7; in particular, the two wheels 34 and 35 may have the same diameter to impart the same angular speed as the crankshaft 3 to the auxiliary shaft 7 and thus balance the first order moments; alternatively, the diameter of the wheel 35 may be half the diameter of the wheel 34 to impart an angular speed which is double the angular speed of the crankshaft 3 to the auxiliary shaft 7 and thus balance the second order moments. It is worth noting that using the auxiliary shaft 7 of the mechanical transmission 9 as "balancing countershaft" has the advantage of using the same component (the auxiliary shaft 7) for two different functions with an obvious optimization which allows to reduce weight and dimensions.

According to a different embodiment, the auxiliary shaft 7 could not be used as "balancing countershaft"; in this case, the auxiliary shaft 7 could be made to rotate in the same direction as the crankshaft 3.

In the embodiment shown in FIGS. 4 and 5, the unbalance of the auxiliary shaft 7 is particularly favorable because it may be obtained by inserting eccentric masses in the two wheels 32 and 35 on the opposite ends of the auxiliary shaft 7 instead of directly in the auxiliary shaft 7: indeed, the diameter of the two wheels 32 and 35 is greater than the diameter of the auxiliary shaft 7 and thus arranging an eccentric weight on the periphery of a wheel 32 or 35 confers a very long arm to the eccentric mass with respect to the rotation axis 8; in this manner, a very small eccentric mass is sufficient, the moment of inertia being the same.

According to a further embodiment (not shown), the auxiliary shaft 7 solely performs the function of balancing countershaft and thus is used to activate neither the circulation pump 6 nor other auxiliary devices; alternatively, the auxiliary shaft 7 activates other auxiliary devices by means of the mechanical transmission 32 but does not activate the circulation pump 6.

The internal combustion engine 1 described above has many advantages.

Firstly, the internal combustion engine 1 described above allows to activate the circulation pump 6 of the cooling system 5 only when actually useful/necessary (i.e. only when the internal combustion engine 1 has reached the optimal working temperature).

Furthermore, in the internal combustion engine 1 described above the actuation of the circulation pump 6 of the cooling system 5 is always of the mechanical type and torque is derived directly from the crankshaft 3; in this manner, the actuation of the circulation pump 6 is much more energy-efficient and the electric system does not need to be overdimensioned.

In the internal combustion engine 1 described above the actuation of the circulation pump 6 of the cooling system 5 is always guaranteed because the coupling device 10 is normally coupled; i.e. in case of malfunctioning of the actuator 15 of the coupling device 10, the coupling device 10, by virtue of the action of the spring 14, always maintains the coupling device 10 in the coupled position.

In the internal combustion engine 1 described above, the auxiliary shaft 7 may also be used as balancing countershaft with obvious optimization of weight and dimensions.

In the internal combustion engine 1 described above, in particular in the embodiment shown in FIGS. 4 and 5, the auxiliary devices may be moved onto the other side of the internal combustion engine 1 with respect to the side from which the crankshaft 3 protrudes, thus freeing up space that may be exploited, for example, to house the mechanical components needed to obtain a selectable four-wheel drive.

Finally, in the internal combustion engine 1 described above, the mechanical transmission 9 is not only used to activate the auxiliary shaft 7 but also to activate the timing (i.e. to rotate the camshafts 37) with obvious optimization of weight and dimensions.

What is claimed is:

1. A "V" internal combustion engine comprising:
a crankshaft;
camshafts that activate intake and exhaust valves;
an auxiliary shaft, which rotates in an opposite direction with respect to the crankshaft and is unbalanced so as to act as balancing countershaft; and
a first mechanical transmission, which receives the motion from the crankshaft and controls the timing by causing the rotation of the camshafts, and causes the rotation of the auxiliary shaft;
wherein the first mechanical transmission comprises: a first wheel, which is rigidly fixed to the crankshaft; a second wheel, which is rigidly fixed to the auxiliary shaft; a third wheel, which is coupled to a first head and transmits the movement to corresponding camshafts of the first head; and a first flexible transmission element, which is closed in a ring shape and is wound around the first wheel, the second wheel and the third wheel;
wherein the first mechanical transmission further comprises a second mechanical transmission which receives the movement from the second wheel rigidly fixed to the auxiliary shaft and transmits the movement to corresponding camshafts of a second head opposite to the first head.

2. An internal combustion engine according to claim 1, wherein each head comprises a corresponding third mechanical transmission, which receives the rotation movement from the third wheel of the first mechanical transmission or from the second transmission and causes the rotation of the corresponding camshafts.

3. An internal combustion engine according to claim 1 and comprising a crankcase, which houses the crankshaft and two heads, which house the cylinders and are arranged in a "V" shape; the auxiliary shaft is arranged above the crankcase between the two heads.

4. An internal combustion engine according to claim 3 and comprising a fourth mechanical transmission, which is arranged on the opposite side of the internal combustion engine with respect to the first mechanical transmission, receives the rotation movement from the auxiliary shaft, and activates at least one auxiliary device.

5. An internal combustion engine according to claim 1, wherein the auxiliary shaft activates at least one auxiliary device.

6. An internal combustion engine according to claim 1, wherein the second mechanical transmission comprises:
a fourth wheel which is integral with the second wheel of first the mechanical transmission;
a fifth wheel which is coupled to the second head and transmits the movement to corresponding camshafts of the second head; and
a second flexible transmission element which is closed in a ring shape and wound about the fourth wheel and the fifth wheel.

* * * * *